United States Patent [19]
Kölbel et al.

[11] 4,232,881
[45] Nov. 11, 1980

[54] SUSPENSION ARRANGEMENT FOR MOTOR VEHICLES

[75] Inventors: Hans J. Kölbel, Wolfsburg; Harald Andres, Velpke, both of Fed. Rep. of Germany

[73] Assignee: Volkswagenwerk Aktiengesellschaft, Fed. Rep. of Germany

[21] Appl. No.: 919,830

[22] Filed: Jun. 28, 1978

[30] Foreign Application Priority Data

Oct. 8, 1977 [DE] Fed. Rep. of Germany ....... 2735939

[51] Int. Cl.³ .............................................. B60G 11/18
[52] U.S. Cl. ................................... 280/721; 267/11 R
[58] Field of Search ............... 280/721, 722, 723, 689; 267/11 R, 15 R

[56] References Cited

U.S. PATENT DOCUMENTS

| | | | |
|---|---|---|---|
| 2,631,842 | 3/1953 | Oppenlander | 267/11 |
| 3,767,224 | 10/1973 | Schneeweiss | 280/723 |
| 3,773,349 | 11/1973 | Boyd | 280/721 |
| 3,778,082 | 12/1973 | Grosseau | 280/723 |
| 4,039,205 | 8/1977 | Castanier | 280/721 |

FOREIGN PATENT DOCUMENTS

| | | | |
|---|---|---|---|
| 2103399 | 8/1972 | Fed. Rep. of Germany | 280/723 |
| 2425740 | 11/1975 | Fed. Rep. of Germany | 280/723 |

*Primary Examiner*—John J. Love
*Assistant Examiner*—John A. Carroll
*Attorney, Agent, or Firm*—Brumbaugh, Graves, Donohue & Raymond

[57] ABSTRACT

A vehicle suspension, wherein the wheels are mounted to bending and torsion resistant longitudinal control arms, is provided with a cross-strut with a U-shaped or V-shaped cross-section mounted between the control arms and gusset plates for strengthening the connection between the cross-strut and the control arms. A transverse corrugation is provided on the cross-strut in the vicinity of the end of the gusset plate, for strengthening the cross-strut in the vicinity of its largest discontinuity in rigidity and thereby increasing its overall strength.

2 Claims, 3 Drawing Figures

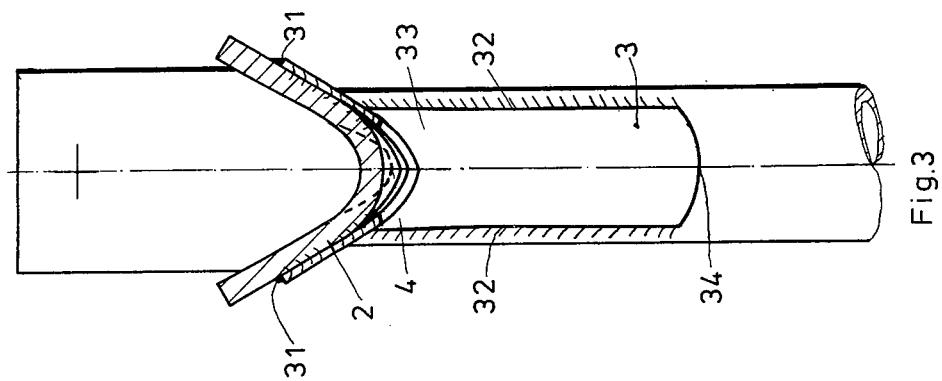
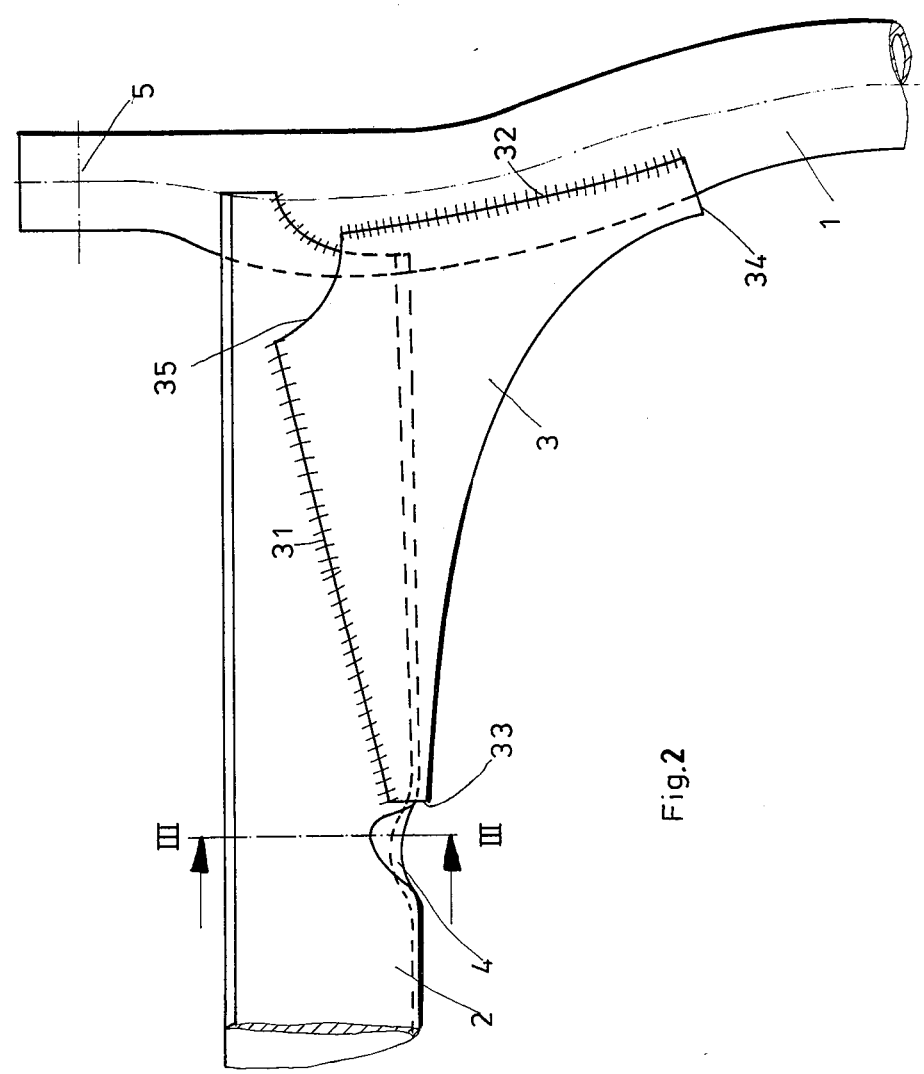

SUSPENSION ARRANGEMENT FOR MOTOR VEHICLES

BACKGROUND OF THE INVENTION

This invention relates to suspension arrangements and particularly to an arrangement wherein a cross-strut with a U-shaped or V-shaped transverse cross-section is mounted between control arms on which the vehicle wheels are mounted. Arrangements of this type, such as disclosed in German Patent Applications Nos. 2,103,399 and 2,425,740 provide an inexpensive suspension configuration expecially for vehicle rear wheels. These suspension arrangements have light weight construction, facilitating rapid movement of the vehicle wheels independent of each other, and may be provided with a cross-strut which is torsion yielding and acts as a stabilizer bar (up to a desired rate of stabilization) without providing a separate stablizer arrangement. A further advantage of the configuration is that only two bearings interconnect the wheel suspension to the vehicle chassis. Further, cornering and lateral deflection forces need not be intercepted by separate elements, since the longitudinal control arms are connected by a cross strut having angular stability, which also acts as a stabilizer bar.

In order to increase the rigidity of the assembly, gussets are usually provided between the cross-strut and the control arms. In the arrangement of German Application No. 2,425,740, the gusset plates are separate laminar plates welded to both the cross-strut and the control arm. Alternately, separate gusset plates in the form of angle brackets may be provided extending between the strut and the control arms. Such brackets may also be formed as integral components of either the cross-strut or the control arms. In the arrangement disclosed in German Application No. 2,103,399 the control arms are widened to form the gusset plate in the vicinity of the cross-strut.

One problem with the arrangement of the prior German applications is the difficulty normally associated with joining any bending-resistant, but torsion-yielding structural member with a rigid member, without resulting in a region of excess stress on the member when torsion and bending stresses are applied. In vehicle suspensions of the type to which this invention relates, the connection between the longitudinal control arms and the cross-strut presents such a problem. In addition to excess stress which will normally arise at the point of discontinuity in rigidity where the cross-strut is connected to the gusset, this region of the suspension is further weakened by the welding process which weakens the metal itself.

It is therefore an object of the invention to provide a vehicle suspension of the type described wherein areas of high peak stress on the cross-strut are avoided.

SUMMARY OF THE INVENTION

The present invention applies to a vehicle suspension, wherein wheels are mounted to bending and torsion resistant longitudinal control arms, and a bending resistant, but torsion yielding cross-strut with a generally U-shaped or V-shaped cross-section is mounted between the control arms, and wherein gusset plates are provided between the cross-strut and the control arms. According to the invention, an improvement is provided to avoid local peak stresses in the structure. A transverse corrugation is provided on the cross-strut in the vicinity of the end of the gusset plate to strengthening the cross-strut in the vicinity of its largest discontinuity in rigidity.

In a preferred embodiment, the gusset plates comprise angle brackets with a generally U-shaped cross section, which are blended smoothly to the contours of the cross-strut and control arms and welded to the strut and arms at their transverse edges to form a closed cross-section between the gusset plate and the strut or arm. The gusset plates have an open end on the strut adjacent which the transverse corrugation is provided.

The provision of a transverse corrugation in the vicinity of the largest discontinuity in rigidity of the cross-strut provides a "breaker effect" which favorably influences the stress gradient in the transition zone so that stress relief will be provided on the cross-strut in the vicinity of the greatest stress peaks, with a resulting stress increase in other portions of the cross-strut which are usually not overstressed. Thus, the additional stresses, which are caused by the transverse corrugation, combine with the original stress response of the suspension to provide a smoother overall stress profile.

Unlike relief bores or similar cuts previously used to relieve stress, the transverse corrugation, according to the present invention, does not lead to weakening of the structural cross-strut. The proposed improvement results in no change in the cross-section of the strut, and can be easily implemented in the manufacturing process at low cost, since no cutting of the structural member is required.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 2 is a plan view of a portion of the FIG. 1 suspension illustrating the present invention.

FIG. 3 is a cross-sectional view of the suspension illustrated in FIG. 2.

DESCRIPTION OF THE INVENTION

Figure 1:
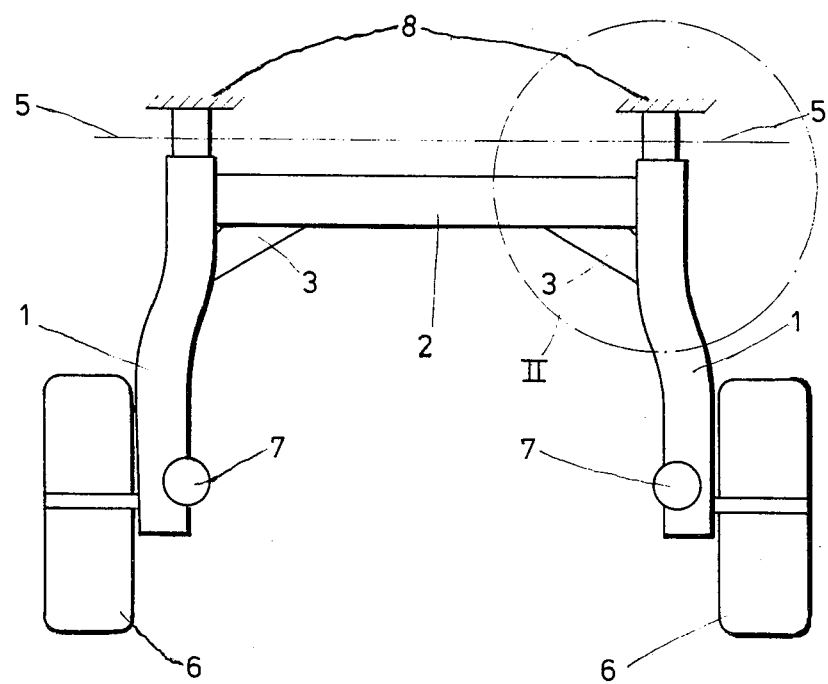
FIG. 1 is a plan view of a vehicle suspension of the type to which the present invention relates.

Referring to the drawing of FIG. 1, there is shown a suspension, particularly useful for the rear wheels of a vehicle, such as an automobile. The suspension includes bending and torsion resistant longitudinal control arms 1 which are made of tubular material. In the particular embodiment illustrated, these control arms are bent in an S-shape, but such bending is not required and not related to the invention. The longitudinal control arms 1 are pivotably mounted at one end to the vehicle chassis 8 by bearings 5, which may be elastic bearings. Coil springs and/or shock absorbers are provided between the ends 7 of the control arms and the vehicle chassis, to provide spring loading of the vehicle.

A cross-strut 2 is provided interconnecting the longitudinal control arms in the vicinity of their connection to the chassis. Cross-strut 2 is designed to be bending resistant, but torsionally yielding, to provide angular stability for the vehicle suspension. Cross-strut 2 is welded to control arms 1, and in order to increase the angular rigidity of the connection, a gusset plate 3 is welded between each control arm and the cross-strut 2. In the embodiment illustrated, the gusset plates 3 are provided as separate components, but those skilled in the art will recognize that the gusset plates might be formed as integral parts of either the longitudinal control arm or the cross-strut.

The improvement of the present invention is illustrated in FIGS. 2 and 3, which are enlarged and detailed illustrations of the area of FIG. 1, at which the cross-strut meets the control arm 1, indicated by circle II. In the embodiment of FIG. 2, the cross-strut 2 has a generally U-shaped (including V-shaped) cross-section. The gusset plate 3 also has a generally U-shaped cross-section and has the form of a right angle bracket which is welded by its transverse edges 31 and 32 to the cross-strut 2 and control arm 1, respectively. In the region of the greatest discontinuity in the rigidity of the cross-strut, immediately next to the tip 33 of the gusset plate on the cross-strut, the cross-strut is provided with a corrugation 4, which extends transversely across the cross-strut. Where the cross-strut has a V-shaped profile, such as an angle iron, the corrugation is provided only in the region of the angle apex. The corrugation 4 influences the stress gradient in an unexpectedly positive manner in the critical zone adjacent the edge of the gusset plate by performing a wave-breaker function. Experiments have indicated that the simple procedure of providing a corrugation of this type, at this spot, can increase the torsional stress strength of the cross-strut by more than 50%.

In the embodiment illustrated in FIG. 2, the gusset plate 3 is not completely welded around its entire periphery to form a closed configuration. The transverse edges 31, 32 are welded to cross-strut 2 and the control arm 1, respectively, but the tip 33 ending at the cross-strut, the tip 34 at the control arm, and the corner 35, where the cross-strut meets the control arm are permitted to remain open. This opening arrangement enables complete anticorrosive surface treatment of the entire suspension, including the control arms, gusset plates, and cross-strut.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

We claim:

1. In a vehicle suspension having wheels mounted to bending and torsion-resistant longitudinal control arms and a bending resistant, but torsion yielding cross-strut with a generally U-shaped cross section mounted between said control arms, and gusset plates between said cross-strut and said control arms, the improvement wherein there is provided a transverse corrugation on said cross-strut in the vicinity of the end of said gusset plate to influence the stress gradient of said cross-strut in said vicinity, which is the point of largest discontinuity in rigidity of said cross-strut, so that said cross-strut is strengthened overall.

2. The improvement specified in claim 1 wherein said gusset plates have a generally U-shaped cross section, and the overall form of a right angle bracket, and blend smoothly to the contour of said cross-strut and said control arms, and wherein said gusset plates are welded to said strut and arms at their transverse edges and remain open at their longitudinal ends, and wherein said corrugation is provided directly in front of the open end of said gusset plate on said cross strut.

* * * * *

UNITED STATES PATENT AND TRADEMARK OFFICE
CERTIFICATE OF CORRECTION

PATENT NO. : 4,232,881
DATED : November 11, 1980
INVENTOR(S) : Harald Andres and Hans J. Kölbel It is certified that error appears in the above-identified patent and that said Letters Patent are hereby corrected as shown below:

First page, Item [75], "Hans J. Kölbel, Wolfsburg; Harald Andres, Velpke," should read --Harald Andres, Velpke; Hans J. Kölbel, Wolfsburg,--;

First page, Item [30], "Oct. 8, 1977" should read -- Aug. 10, 1977 --.

Column 1, line 13, "expecially" should read --especially--;
Column 1, line 19, "stablizer" should read --stabilizer--.

Signed and Sealed this

Fifth Day of May 1981

[SEAL]

Attest:

RENE D. TEGTMEYER

Attesting Officer  Acting Commissioner of Patents and Trademarks